US012659979B2

(12) United States Patent
Liu et al.

(10) Patent No.: US 12,659,979 B2
(45) Date of Patent: Jun. 16, 2026

(54) MANAGING INTERLACED SIDELINK FEEDBACK

(71) Applicant: QUALCOMM Incorporated, San Diego, CA (US)

(72) Inventors: Chih-Hao Liu, San Diego, CA (US); Jing Sun, San Diego, CA (US); Giovanni Chisci, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/365,656

(22) Filed: Aug. 4, 2023

(65) Prior Publication Data

US 2025/0048401 A1 Feb. 6, 2025

(51) Int. Cl.
*H04W 72/40* (2023.01)
*H04W 72/0453* (2023.01)

(52) U.S. Cl.
CPC ....... *H04W 72/40* (2023.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2022/0078647 | A1* | 3/2022 | Qu | H04W 72/20 |
| 2022/0095298 | A1* | 3/2022 | Huang | H04L 5/0055 |
| 2022/0116961 | A1* | 4/2022 | Abotabl | H04L 5/0039 |
| 2024/0422752 | A1* | 12/2024 | Miao | H04L 1/1854 |

OTHER PUBLICATIONS

International Search Report and Written Opinion—PCT/US2024/037520—ISA/EPO—Oct. 28, 2024.
Qualcomm Incorporated: "Physical Channel Design for Sidelink on Unlicensed Spectrum", 3GPP TSG-RAN WG1 #113, R1-2305338, 3rd Generation Partnership Project (3GPP), Mobile Competence Centre, 650, Route Des Lucioles, F-06921 Sophia-Antipolis Cedex, France, vol. 3GPP RAN 1, No. May 22, 2023-May 26, 2023, May 21, 2023, XP052394172, pp. 1-39, Figure 15, Section 2.3.
Zte, et al., "Discussion on Physical Layer Structures and Procedures for SL-U", 3GPP TSG RAN WG1 #111, R1-2212207, Type Discussion, NR SL ENH2-Core, 3rd Generation Partnership Project (3GPP), Mobile Competence Centre, 650, Route Des Lucioles, F-06921 Sophia-Antipolis Cedex, France, vol. RAN WG1, No. Toulouse, France, Nov. 14, 2022-Nov. 18, 2022, Nov. 7, 2022, 17 Pages, XP052222770, Figure 11, Section 2.

* cited by examiner

*Primary Examiner* — Srinivasa R Reddivalam
(74) *Attorney, Agent, or Firm* — Holland & Hart LLP

(57) ABSTRACT

Methods, systems, and devices for wireless communications are described. The described techniques provide for determining whether to drop an additional signal at an edge interlaced resource block (IRB) of a common interlace. A user equipment (UE) may transmit additional signals via IRBs of the common interlace to improve an occupied channel bandwidth (OCB) of a feedback transmission and may drop one or more additional signals that are proximate (e.g., in frequency) to feedback indications of a configured interlace. To ensure the OCB of the transmission satisfies an OCB threshold, the UE may determine whether to drop an additional signal at an edge IRB, despite the edge IRB being proximate to a feedback indication, according to one or more rules that may be specific to edge IRBs.

30 Claims, 9 Drawing Sheets

PSFCH 305-a

OCB 310-a

301

PSFCH 305-b

OCB 310-b

302

Feedback Indication
315

Additional Signal 320

Dropped Signal 325

PSFCH 425

Edge IRB 430-a        IRB 435-a        IRB 435-b        Edge IRB 430-b        IRB 435-c Common Interlace 440        Configured Interlace 445

510

520

515

505

500

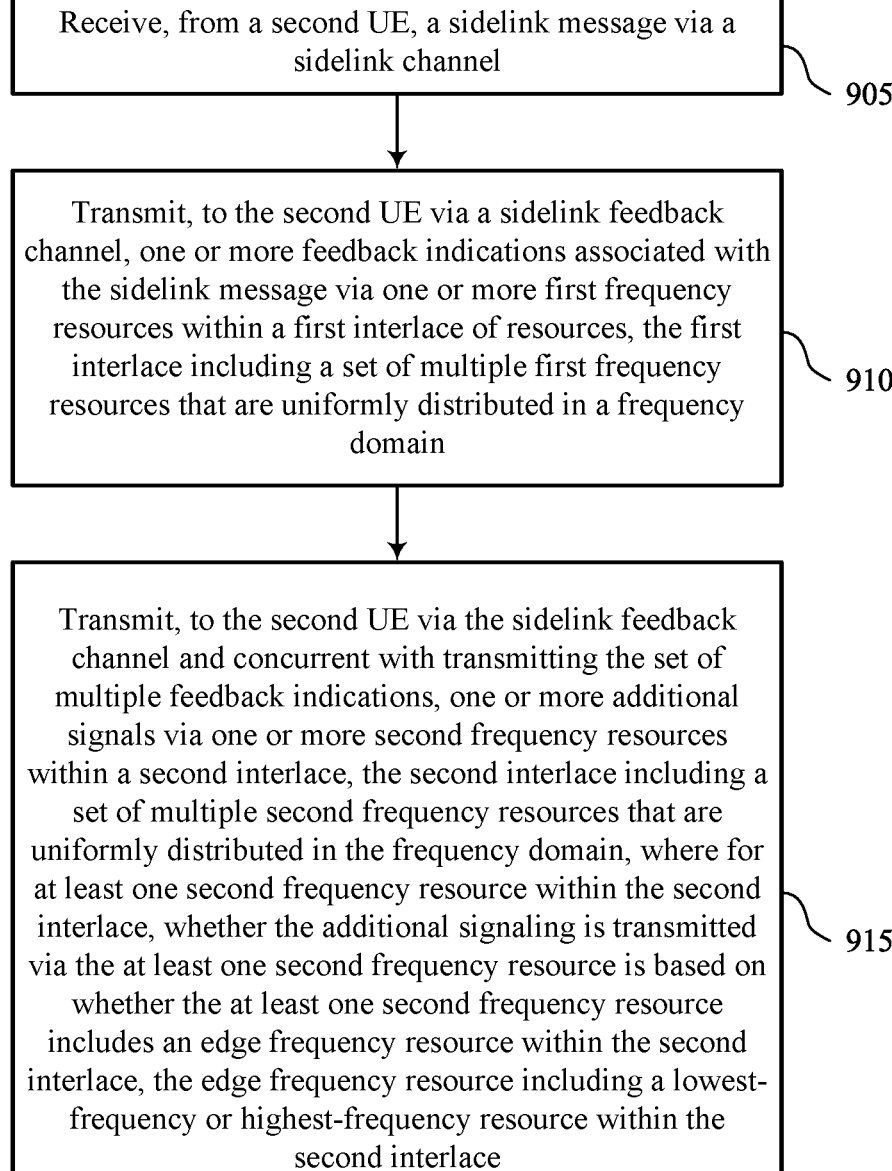

Receive, from a second UE, a sidelink message via a sidelink channel

905

Transmit, to the second UE via a sidelink feedback channel, one or more feedback indications associated with the sidelink message via one or more first frequency resources within a first interlace of resources, the first interlace including a set of multiple first frequency resources that are uniformly distributed in a frequency domain

910

Transmit, to the second UE via the sidelink feedback channel and concurrent with transmitting the set of multiple feedback indications, one or more additional signals via one or more second frequency resources within a second interlace, the second interlace including a set of multiple second frequency resources that are uniformly distributed in the frequency domain, where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace

MANAGING INTERLACED SIDELINK FEEDBACK

FIELD OF TECHNOLOGY

The following relates to wireless communications, including managing interlaced sidelink feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support sidelink communications between one or more wireless devices (e.g., UEs). In some examples, UEs communicating via sidelink may select resources from resources included in a sidelink feedback channel (e.g., physical sidelink feedback channel (PSFCH)) and utilize the selected resource to receive feedback messages responsive of previously received sidelink messages.

SUMMARY

The described techniques relate to improved methods, systems, devices, and apparatuses that support managing interlaced sidelink feedback. For example, the described techniques provide for determining whether to drop (e.g., refrain from transmitting) an additional signal (e.g., a dummy signal) at an edge interlaced resource block (IRB) of a common interlace. A user equipment (UE) may transmit additional signals via IRBs of the common interlace to improve an occupied channel bandwidth (OCB) of a feedback transmission and may drop one or more additional signals that are proximate (e.g., in frequency) to feedback indications of a configured interlace. For example, if an IRB is within a threshold distance (in frequency) of a feedback indication, the UE may drop an additional signal that would otherwise have been transmitted via the IRB—e.g., to improve transmission power of the nearby feedback indication without exceeding a power spectral density (PSD) limit.

In some cases, however, dropping an additional signal from an edge IRB of the common interlace (e.g., a highest-frequency or lowest-frequency IRB) may cause the OCB of the transmission to be below an OCB threshold. To ensure the OCB of the transmission satisfies the OCB threshold, the UE may determine whether to drop an additional signal from an edge IRB according to one or more rules (e.g., based on additional considerations), as described herein. For example, the UE may refrain from dropping signals from any edge IRBs (e.g., based on an explicit no dropping rule for edge resources). Or, as an alternative, the UE may drop a signal from at most one edge IRB (e.g., if a quantity of IRBs in the common interlace is below a threshold). Or, as another alternative, the UE may determine whether to drop a signal from an edge IRB based on whether or not the OCB threshold would remain satisfied with the signal dropped from the edge IRB (e.g., the UE may drop the signal from the edge IRB if the OCB threshold would remain satisfied, or the UE may transmit the signal via the edge IRB despite the IRB being within a threshold distance of a feedback indication if dropping the signal from the edge IRB would cause the OCB threshold to be unsatisfied).

A method for wireless communications by a first UE is described. The method may include receiving, from a second UE, a sidelink message via a sidelink channel, transmitting, to the second UE via a sidelink feedback channel, one or more feedback indications associated with the sidelink message via one or more first frequency resources within a first interlace of resources, the first interlace including a set of multiple first frequency resources that are uniformly distributed in a frequency domain, transmitting, to the second UE via the sidelink feedback channel and concurrent with transmitting the one or more of feedback indications, one or more additional signals via one or more second frequency resources within a second interlace, the second interlace including a set of multiple second frequency resources that are uniformly distributed in the frequency domain, and where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace.

A first UE for wireless communications is described. The first UE may include one or more memories storing processor executable code, and one or more processors coupled with the one or more memories. The one or more processors may individually or collectively operable to execute the code to cause the first UE to receive, from a second UE, a sidelink message via a sidelink channel, transmit, to the second UE via a sidelink feedback channel, one or more feedback indications associated with the sidelink message via one or more first frequency resources within a first interlace of resources, the first interlace including a set of multiple first frequency resources that are uniformly distributed in a frequency domain, transmit, to the second UE via the sidelink feedback channel and concurrent with transmitting the one or more of feedback indications, one or more additional signals via one or more second frequency resources within a second interlace, the second interlace including a set of multiple second frequency resources that are uniformly distributed in the frequency domain, and where for at least one second frequency resource within the second interlace, whether the additional signaling be transmitted via the at least one second frequency resource is based on whether the at least one second frequency resource includes an edge frequency resource within the second interlace, the edge frequency resource including a lowest-frequency or highest-frequency resource within the second interlace.

Another first UE for wireless communications is described. The first UE may include means for receiving, from a second UE, a sidelink message via a sidelink channel, means for transmitting, to the second UE via a sidelink feedback channel, one or more feedback indications associated with the sidelink message via one or more first frequency resources within a first interlace of resources, the first interlace including a set of multiple first frequency resources that are uniformly distributed in a frequency domain, means for transmitting, to the second UE via the sidelink feedback channel and concurrent with transmitting the one or more of feedback indications, one or more additional signals via one or more second frequency resources within a second interlace, the second interlace including a set of multiple second frequency resources that are uniformly distributed in the frequency domain, and means for where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace.

A non-transitory computer-readable medium storing code for wireless communications is described. The code may include instructions executable by a processor to receive, from a second UE, a sidelink message via a sidelink channel, transmit, to the second UE via a sidelink feedback channel, one or more feedback indications associated with the sidelink message via one or more first frequency resources within a first interlace of resources, the first interlace including a set of multiple first frequency resources that are uniformly distributed in a frequency domain, transmit, to the second UE via the sidelink feedback channel and concurrent with transmitting the one or more of feedback indications, one or more additional signals via one or more second frequency resources within a second interlace, the second interlace including a set of multiple second frequency resources that are uniformly distributed in the frequency domain, and where for at least one second frequency resource within the second interlace, whether the additional signaling be transmitted via the at least one second frequency resource is based on whether the at least one second frequency resource includes an edge frequency resource within the second interlace, the edge frequency resource including a lowest-frequency or highest-frequency resource within the second interlace.

In some examples of the method, first UE, and non-transitory computer-readable medium described herein, transmitting the one or more feedback indications and the one or more additional signals may include operations, features, means, or instructions for transmitting a first feedback indication of the one or more feedback indications via a first frequency resource within the first interlace and determining whether to transmit a first additional signal of the one or more additional signals via the at least one second frequency resource within the second interlace based on whether a separation, in the frequency domain, between the first frequency resource and the second frequency resource satisfies a separation threshold.

In some examples of the method, first UE, and non-transitory computer-readable medium described herein, the separation between the first frequency resource and the at least one second frequency resource fails to satisfy the separation threshold and the method, apparatuses, and non-transitory computer-readable medium may include further operations, features, means, or instructions for transmitting the first additional signal via the at least one second frequency resource, despite the separation between the first frequency resource and the second frequency resource failing to satisfy the separation threshold, based on the at least one second frequency resource including the edge frequency resource.

In some examples of the method, first UE, and non-transitory computer-readable medium described herein, the at least one second frequency resource includes the edge resource and the method, apparatuses, and non-transitory computer-readable medium may include further operations, features, means, or instructions for dropping the first additional signal based on the separation between the first frequency resource and the second frequency resource failing to satisfy the separation threshold and further based on transmitting a second additional signal via another edge frequency resource of the second interlace.

In some examples of the method, first UE, and non-transitory computer-readable medium described herein, a second feedback indication of the one or more feedback indications may be transmitted via another first frequency resource within the first interlace, a separation, in the frequency domain, between the other first frequency resource and the other edge frequency resource fails to satisfy the separation threshold, and transmitting the second additional signal via the other edge frequency resource of the second interlace, despite the separation between the other first frequency resource and other edge frequency resource failing to satisfy the separation threshold, occurs based on the first additional signal being dropped.

In some examples of the method, first UE, and non-transitory computer-readable medium described herein, the at least one second frequency resource includes the edge frequency resource and the method, apparatuses, and non-transitory computer-readable medium may include further operations, features, means, or instructions for dropping the first additional signal based on the one or more first frequency resources within the first interlace and the one or more second frequency resources within the second interlace, excluding the at least one second frequency resource, spanning a first bandwidth that satisfies a second threshold.

In some examples of the method, first UE, and non-transitory computer-readable medium described herein, the second threshold includes a percentage of a second bandwidth associated with the sidelink feedback channel.

In some examples of the method, first UE, and non-transitory computer-readable medium described herein, the separation between the first frequency resource and the at least one second frequency resource fails to satisfy the separation threshold and the method, apparatuses, and non-transitory computer-readable medium may include further operations, features, means, or instructions for transmitting the first additional signal via the at least one second frequency resource, despite the separation between the first frequency resource and the second frequency resource failing to satisfy the separation threshold, based on the one or more first frequency resources within the first interlace and the one or more second frequency resources within the second interlace, excluding the at least one second frequency resource, spanning a first bandwidth that fails to satisfy a second threshold.

In some examples of the method, first UE, and non-transitory computer-readable medium described herein, the second threshold includes a percentage of a second bandwidth associated with the sidelink feedback channel.

Some examples of the method, first UE, and non-transitory computer-readable medium described herein may further include operations, features, means, or instructions for dropping the first additional signal based on the separation between the first frequency resource and the second frequency resource failing to satisfy the separation threshold and further based on the at least one second frequency resource not including the edge frequency resource.

In some examples of the method, first UE, and non-transitory computer-readable medium described herein, the separation threshold includes a quantity of one or more resource blocks in the frequency domain, a span in the frequency domain, or both.

In some examples of the method, first UE, and non-transitory computer-readable medium described herein, each first frequency resource within the first interlace may be offset, within the frequency domain, from a respective second frequency resource within the second interlace by a same quantity of one or more resource blocks.

In some examples of the method, first UE, and non-transitory computer-readable medium described herein, the second interlace may be common to one or more UEs, the one or more UEs including at least the first UE.

In some examples of the method, first UE, and non-transitory computer-readable medium described herein, the one or more additional signals include noise signals.

BRIEF DESCRIPTION OF THE DRAWINGS

FIG. 9 shows a flowchart illustrating methods that support managing interlaced sidelink feedback in accordance with one or more aspects of the present disclosure.

DETAILED DESCRIPTION

Figure 1:
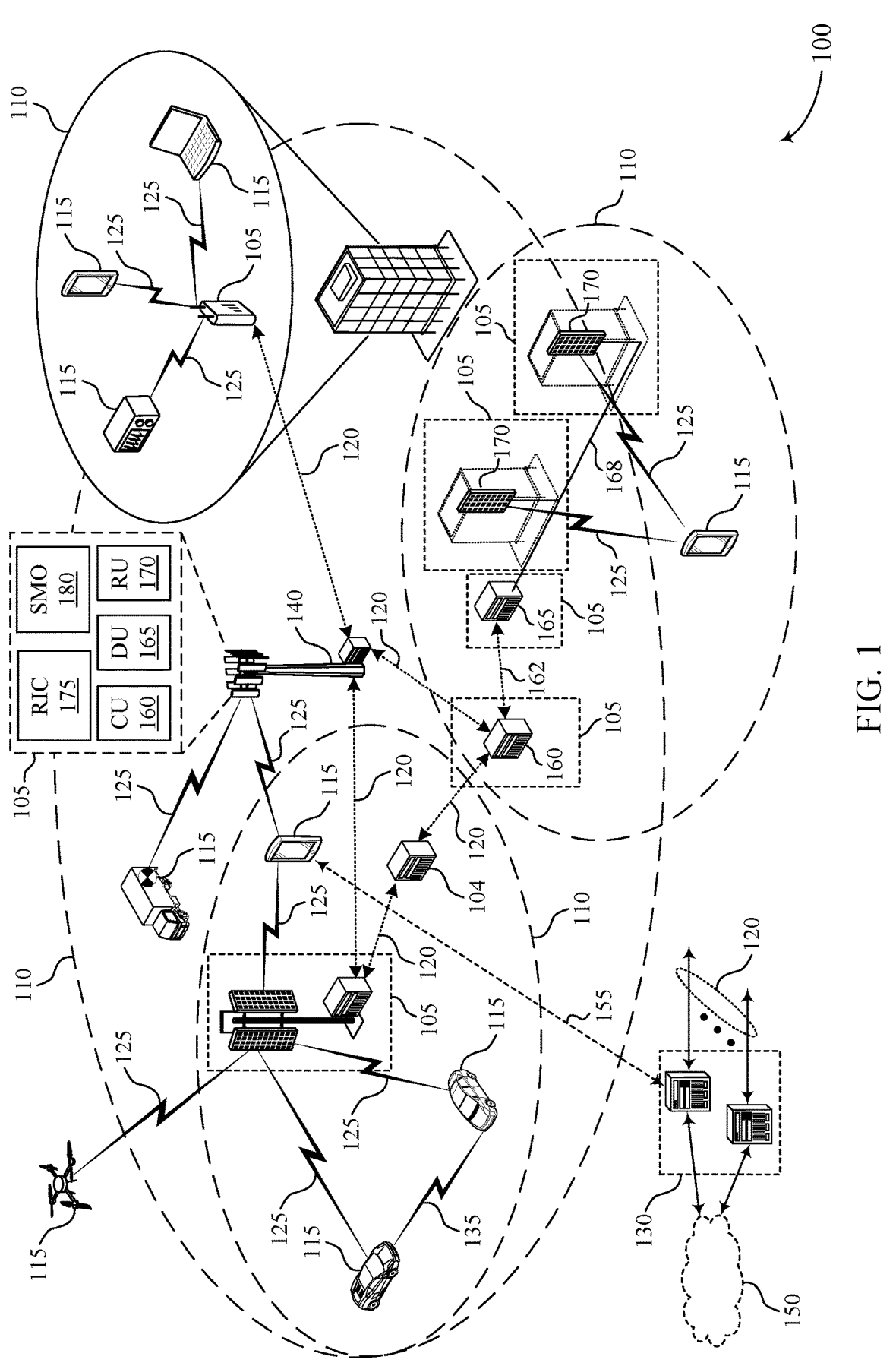
FIG. 1 shows an example of a wireless communications system that supports managing interlaced sidelink feedback in accordance with one or more aspects of the present disclosure.

In some wireless communications systems, multiple user equipments (UEs) may communicate directly with one another in a sidelink communications mode. For example, a transmitting sidelink UE may transmit data to one or more other sidelink UEs via a sidelink data channel (e.g., a physical sidelink shared channel (PSSCH) or a physical sidelink control channel (PSCCH)). Responsive to the data transmission, a receiving UE may transmit, via a sidelink feedback channel corresponding to the sidelink data channel (e.g., a physical sidelink feedback channel (PSFCH)), an indication of whether the data transmission was successfully received, such as a hybrid automatic repeat request (HARQ) acknowledgment (HARQ-ACK) or a HARQ-negative acknowledgment (HARQ-NACK). In some examples, frequency resources (e.g., a resource block (RB)) of the PSFCH may be divided into sets of resources based on a quantity of subchannels and a quantity of slots of a PSSCH associated with the PSFCH. Accordingly, a receiving UE may determine a PSFCH resource for transmitting feedback based on an identifier of the transmitting UE and an identifier of the receiving UE.

In some cases, to support satisfying an occupied channel bandwidth (OCB) threshold (e.g., a transmitting device may be expected to occupy at least 80% of a PSFCH bandwidth), the UE may extend a PSFCH transmission using an interlaced waveform configuration. In such a configuration, one or more interlaces of interlaced RBs (IRBs) may be defined over the bandwidth of the PSFCH. An interlace of the one or more interlaces may include a quantity of IRBs (e.g., 10 IRBs or some other quantity) that are uniformly distributed through the bandwidth of the PSFCH. In some examples, such as when a relatively large quantity of UEs are transmitting feedback information via the PSFCH, the UEs may identify one or more common resources (e.g., a common interlace), one or more dedicated resources, or both for transmitting feedback or additional signals. For example, a UE may transmit one or more feedback indications via IRBs of a configured interlace (e.g., an interlace configured for the UE to transmit feedback). Additionally, the UE may transmit additional signaling (e.g., a dummy signal, non-useful information, known information) via IRBs of the common interlace (e.g., to ensure the OCB threshold is satisfied). In some examples, if the UE selects an IRB of the configured interlace to carry a feedback indication that is relatively close to an IRB of the common interlace carrying an additional signal (e.g., separated in frequency by less than a threshold frequency range or configured quantity of RBs), the UE may drop (e.g., refrain from transmitting) the additional signal of the common interlace (e.g., to avoid exceeding a power spectral density (PSD) limit).

However, dropping an additional signal at an edge IRB of the common interlace (e.g., a highest-frequency or lowest-frequency IRB) may in some cases result in the UE failing to satisfy the OCB threshold. As used herein, dropping a signal or message may refer to refraining from transmitting (e.g., not transmitting) the signal or message, such as when the signal or message would otherwise (e.g., but for the dropping) have been transmitted. Also, dropping a signal or message may alternatively, in some cases, be referred to herein as dropping a resource (e.g., dropping an IRB) that would otherwise (e.g., but for the dropping) have been used to transmit the signal or message.

To ensure OCB constraints are satisfied when transmitting feedback via a configured interlace, the UE may determine whether to drop an additional signal of the common interlace according to one or more rules. For example, the one or more rules may indicate that the UE is to transmit additional signals via edge IRBs even when feedback indications are transmitted near the edge IRBs. Or, for example, the one or more rules may indicate that the UE is to transmit an additional signal via at least one edge IRB (e.g., the UE is to drop an additional signal from at most one edge IRB out of the two edge IRBs of the common interlace). Which edge IRB is dropped may depend, for example, on which edge IRB is closest in frequency to a feedback indication. Whether a UE may drop both edge IRBs or at most one edge IRB may depend on a size of the common interlace (e.g., may depend on whether a quantity of IRBs included in the common interlace satisfies a threshold). As another example, the UE may determine whether the OCB threshold would remain satisfied with an edge IRB dropped, and the UE may drop the edge IRB if the OCB threshold would remain satisfied, or transmit the additional signal via the edge IRB if the OCB threshold would otherwise be unsatisfied.

Aspects of the disclosure are initially described in the context of wireless communications systems. Aspects of the disclosure are further illustrated by and described with reference to an interlacing resource block configuration and a process flow. Aspects of the disclosure are further illustrated by and described with reference to apparatus diagrams, system diagrams, and flowcharts that relate to managing interlaced sidelink feedback.

FIG. 1 shows an example of a wireless communications system 100 that supports managing interlaced sidelink feedback in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support managing interlaced sidelink feedback as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, a UE 115 may support an interlacing PSFCH design for transmitting sidelink feedback information. The interlacing PSFCH design may include a configuration of one or more interlaces in the PSFCH. In some examples, a UE 115 may transmit feedback indications (e.g., ACK or NACK) via one or more IRBs of an interlace. For example, the UE 115 may occupy a first interlace (e.g., an interlaced configured by a network entity 105) of the PSFCH for transmitting feedback indications. Further, the UE 115 may occupy a common interlace (e.g., an interlace shared with one or more other UEs 115) of the PSFCH for transmitting additional signaling (e.g., dummy signals, non-useful information). In some examples, the UE 115 may transmit feedback via IRBs of the first interlace that are offset from IRBs of the common interlace.

In some cases, the UE 115 may reduce a transmission power for (e.g., drop) a common IRB that is within a threshold frequency of a feedback carrying IRB to avoid exceeding a PSD limit. However, if the common IRB is an edge IRB of the common interlace (e.g., a highest-frequency or lowest-frequency IRB), the UE 115 may make an additional determination of whether to drop the edge IRB according to one or more rules. For example, the one or more rules may indicate that the UE 115 is to refrain from dropping signals from any edge IRB of the common interlace. Or the one or more rules may indicate that the UE 115 is to drop signals from at most one edge IRB of the common interlace (e.g., the UE is to transmit via at least one edge IRB of the common interlace). Or, alternatively, the one or more rules may indicate that the UE 115 is to drop a signal from an edge IRB of the common interlace based on whether or not the OCB threshold would remain satisfied with the signal dropped from the edge IRB.

Figure 2:
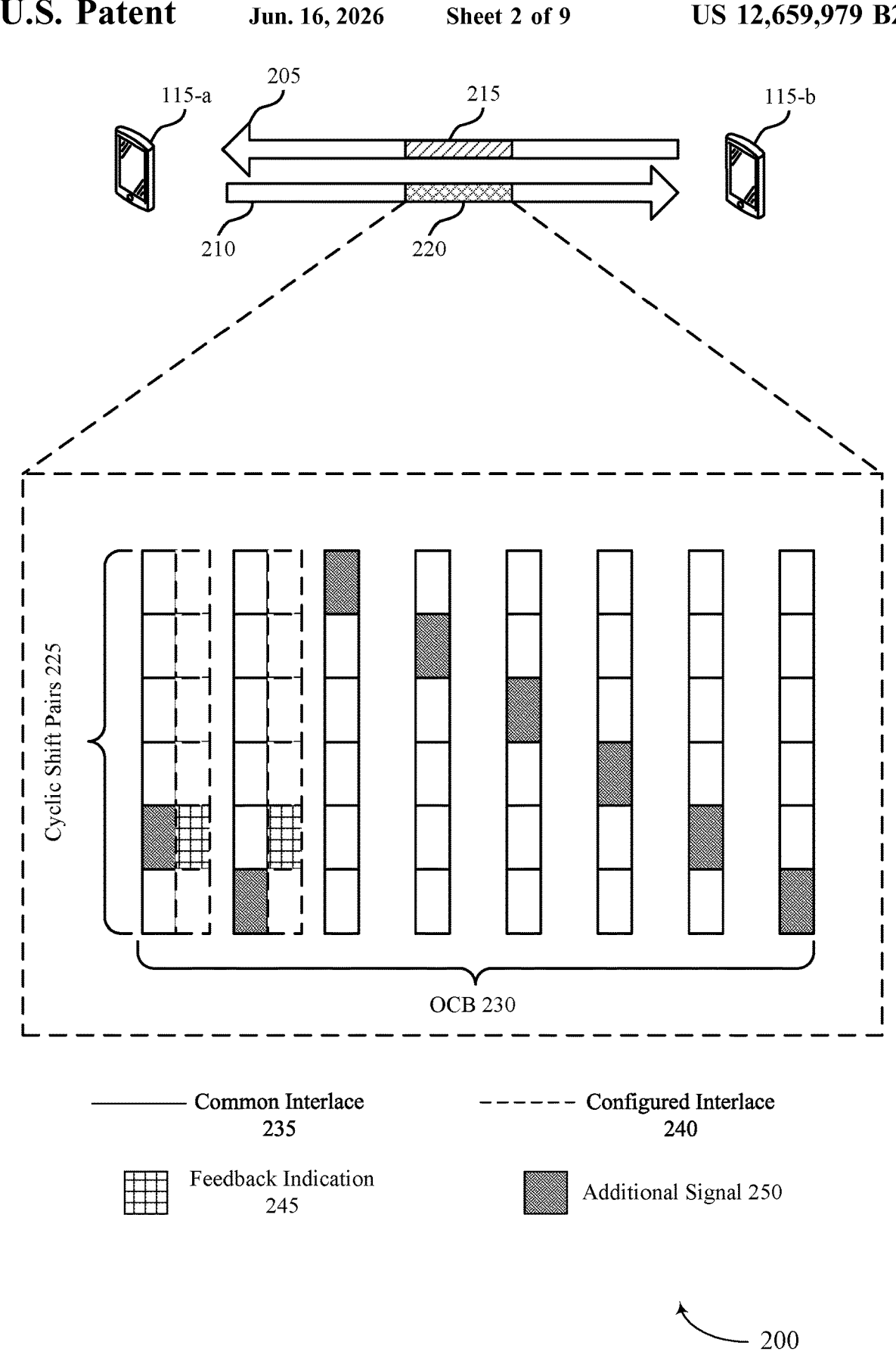
FIG. 2 shows an example of a wireless communications system that supports managing interlaced sidelink feedback in accordance with one or more aspects of the present disclosure.

FIG. 2 shows an example of a wireless communications system 200 that supports managing interlaced sidelink feedback in accordance with one or more aspects of the present disclosure. The wireless communications system 200 may include one or more aspects of the wireless communications system 100. For example, the wireless communications system 200 may include a UE 115-a and a UE 115-b, which may each be examples of a UE 115 as described with reference to FIG. 1. In some cases, the wireless communications system 200 may illustrate an interlaced PSFCH configuration for transmitting feedback information from the UE 115-a to the UE 115-b, such as a HARQ-ACK or a HARQ-NACK.

In some examples, the UE 115-a and the UE 115-b may communicate according to a sidelink configuration (e.g., perform communications independent of a network entity 105). For example, the UE 115-b may transmit a sidelink data transmission 215 via a sidelink data channel 205 (e.g., PSSCH or PSCCH) and the UE 115-a may transmit a sidelink feedback transmission 220 via a sidelink feedback channel 210 (e.g., PSFCH). In some cases, the sidelink data channel 205 and the sidelink feedback channel 210 may be examples of a same bandwidth at different symbols of a sidelink slot. In some cases, the sidelink feedback transmission 220 may be performed according to an interlacing configuration of the sidelink feedback channel 210.

The interlacing configuration may indicate one or more interlaces associated with the sidelink feedback channel 210. For example, the sidelink feedback channel 210 may include a common interlace 235 and a configured interlace 240, which may each be associated with a respective interlace index (e.g., interlace #0 and interlace #1). Each interlace may include a set of IRBs (e.g., 10 IRBs, 11 IRBs, or another quantity of IRBs) that are uniformly distributed across the channel bandwidth according to the interlace indices. For example, each IRB of the configured interlace 240 may be offset from a corresponding IRB of the common interlace 235 by a quantity of PRBs according to the interlace indices (e.g., corresponding IRBs of interlace #0 and interlace #1 may be offset by 1 PRB). Additionally, or alternatively, each IRB may include a set of cyclic shift pairs 225 for carrying signaling, which may improve a capacity of the sidelink feedback channel 210 (e.g., allowing multiple UEs 115 to transmit via a same IRB). In some cases, the UE 115-a may apply cyclic shift ramping to IRBs of the common interlace 235 (e.g., each additional signal 250 is offset by a cyclic shift pair from a previous IRB of the common interlace 235) to limit a PAPR of the sidelink feedback transmission 220. Such interlacing may support an extended PSFCH waveform to satisfy OCB constraints (e.g., 60%, 75%, 80% OCB) and improve PSFCH capacity. For example, by transmitting additional signals 250 (e.g., dummy signals, non-useful information, known information, or any combination thereof) via each IRB of the common interlace 235, the PSFCH waveform may have an OCB 230 that satisfies OCB constraints.

In some cases, the UE 115-a may transmit one or more feedback indications 245 via one or more IRBs of the configured interlace 240. For example, the UE 115-a may be configured (e.g., by a network entity 105) to transmit a quantity of feedback indications 245 via contiguous IRBs of the configured interlace 240. By transmitting multiple feedback indications 245 via the configured interlace 240, the UE 115-a may improve a transmit power and robustness (e.g., reducing disturbances of other UEs 115 near the UE 115-a) of the sidelink feedback transmission 220.

In some examples, the UE 115-a may adjust a transmission power of an additional signal 250 due to a proximity (e.g., in frequency) to a feedback indication 245. To support an increased transmission power of a feedback indication 245 while satisfying (e.g., remaining below) the PSD limit of the PSFCH, the UE 115-a may drop (e.g., refrain from transmitting) an additional signal 250 that is within a frequency threshold (e.g., 1 MHZ, a quantity of PRBs, or another frequency value) of the feedback indication 245. For example, if the UE 115-a transmits feedback indications 245 via a first and second IRB of the configured interlace 240, the UE 115-a may drop the additional signals 250 at a first and second IRB of the common interlace 235.

In some cases, however, dropping an additional signal 250 at an edge IRB of the common interlace 235 (e.g., a highest-frequency or lowest-frequency IRB) may result in the OCB 230 of the sidelink feedback transmission 220 failing to satisfy an OCB threshold of the PSFCH. For example, if the additional signal 250 is dropped at the lowest-frequency IRB of the common interlace 235 to accommodate a feedback indication 245 that is offset by a quantity of PRBs, the OCB 230 may be reduced by the quantity of PRBs and may fall below the OCB threshold. As an example, the OCB threshold may indicate that the UE 115-a is to transmit via at least 80% of the PSFCH (e.g., 45 RBs), and dropping the lowest-frequency (or highest-frequency) IRB of the common interlace 235 may result in the OCB 230 being below the 80% threshold (e.g., 43 RBs).

To ensure the OCB 230 satisfies OCB constraints of the PSFCH, the UE 115-a may determine whether to drop an additional signal 250 according to one or more rules (e.g., additional considerations). For example, the one or more rules may indicate that the UE 115-a is to transmit additional signals via all edge IRBs of the common interlace 235 even when feedback indications are transmitted near one or more of the edge IRBs. Or the one or more rules may indicate that the UE 115-a is to transmit an additional signal via at least one edge IRB of the common interlace 235 (e.g., is to drop an additional signal from at most one edge IRB). If both edge IRBs are within a threshold distance (in frequency) of a feedback indication, and the UE 115-a is to drop at most one edge IRB, the UE 115-a may drop the edge IRB that is relatively closest in frequency to its respective nearest feedback indication, or the UE 115-a may drop the edge IRB that would reduce the OCB 230 by the least amount, among other possibilities. Whether the UE 115-a is to refrain from dropping any edge IRBs or is able to drop up to one edge IRB from the common interlace 235 may depend on a size of the common interlace 235 (e.g., if a quantity of IRBs in the common interlace 235 is less than a threshold quantity, then the UE 115-a may not be allowed to drop any edge IRBs; if a quantity of IRBs in the common interlace 235 is equal to or greater than a threshold quantity, then the UE 115-a may be allowed to drop up to one edge IRB). Or, as another alternative, the one or more rules may indicate that the UE 115-a is to drop an edge IRB of the common interlace 235 if the UE 115-a determines that the OCB 230 would satisfy the OCB threshold even with the edge IRB dropped; otherwise, if the UE 115-a determines that dropping the edge IRB would cause the OCB 230 be below the OCB threshold, then the UE 115-a may not be ablet to drop the edge IRB. Such techniques may enable the UE 115-a to avoid dropping an edge IRB of the common interlace 235 that would result in the OCB 230 failing to satisfy the OCB threshold of the PSFCH, thereby improving communicating feedback via the configured interlace 240.

Figures 3A, 3B:
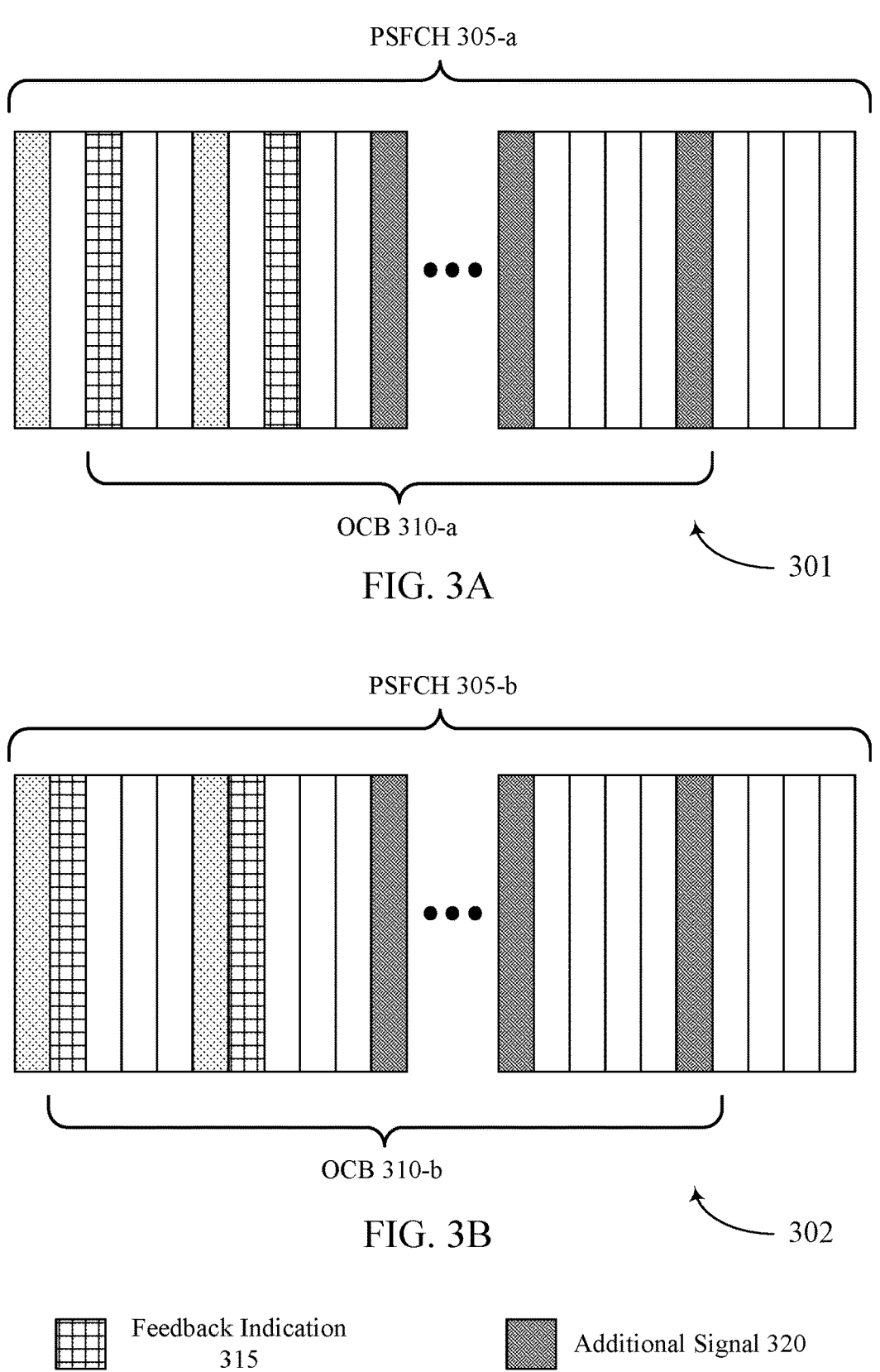
FIGS. 3A and 3B show examples of interlace configurations that supports managing interlaced sidelink feedback in accordance with one or more aspects of the present disclosure.

FIGS. 3A and 3B show examples of interlace configurations 301 and 302 that support managing interlaced sidelink feedback in accordance with one or more aspects of the present disclosure. The interlace configurations 301 and 302 may be implemented by one or more aspects of the wireless communications systems 100 and 200. For example, the interlace configurations 301 and 302 may be examples of interlaced IRBs included in a PSFCH 305 for communicating sidelink feedback between UEs 115 described with reference to FIGS. 1 and 2. In some cases, the interlace configurations 301 and 302 may support a UE 115 identifying whether to drop an additional signal via an IRB of the common interlace according to a frequency location of the IRB.

The interlace configuration 301 illustrates a sidelink feedback transmission via the PSFCH 305-*a*, which may include one or more interlaces. For example, the PSFCH 305-*a* may include a quantity of interlaces (e.g., 5 interlaces as illustrated in FIG. 3A, in which every fifth IRB is included in the same interlace), such as a common interlace at a first interlace index (e.g., interlace #0, including the lowest-frequency edge IRB—left-most in the diagram—and every fifth IRB to the right of the lowest-frequency edge IRB in the diagram) and a configured interlace at a second interlace index (e.g., interlace #2, including the IRB that is two to the right of the lowest-frequency edge IRB every fifth IRB to the right thereof in the diagram). Each interlace may include respective sets of IRBs that are uniformly distributed across a bandwidth of the PSFCH 305-*a*.

In some cases, a UE 115 may transmit one or more feedback indications 315 via IRBs of the configured interlace (e.g., feedback responsive to a data transmission). The UE 115 may be configured to transmit a quantity of feedback indications 315 via IRBs of the configured interlace that are contiguous within the context of that interlace (e.g., that have no other IRBs of the same configured interlace between them in frequency). For example, the UE 115 may transmit two feedback indications 315 via a first and second IRB of the configured interlace. Additionally, or alternatively, the UE 115 may transmit additional signaling (e.g., dummy signals) via IRBs of the common interlace to increase an OCB 310-*a* of the sidelink feedback transmission. For example, the PSFCH 305-*a* may be associated with an OCB threshold (e.g., 80% for a subcarrier spacing (SCS) of 30 kHz) that the sidelink feedback transmission is expected to satisfy, and transmitting additional signals 320 via each IRB of the common interlace may improve a bandwidth spanned by the sidelink feedback transmission.

As discussed herein, the UE 115 may, at least as a default, drop one or more additional signals 320 if the additional signals 320 are within a frequency threshold of a feedback indication 315 (e.g., to avoid exceeding a PSD limit). For example, if the feedback indications 315 occupy the first and second IRBs of the configured interlace and are within the frequency threshold (e.g., 1 MHZ, a configured quantity of PRBs) of some IRBs of the common interlace, the additional signals 320 that would otherwise be transmitted via those IRBs may instead be dropped (e.g., not transmitted), as shown by the dropped signals 325 (e.g., zero transmission power) within FIG. 3B. However, in some cases, if an edge IRB of the common interlace is dropped, the OCB 310-*a* may fail to satisfy the OCB threshold of the PSFCH 305-*a*. For example, as in the example of FIG. 3A, if an additional signal 320 of the lowest-frequency IRB of the common interlace is dropped, the OCB 310-*a* may be reduced from a first quantity of PRBs to a second quantity of PRBs, which may drop the OCB 310-*a* below the OCB threshold. To ensure the OCB 310-*a* remains above the OCB threshold, the UE 115 may determine whether to drop edge IRBs of the common interlace, even when a separation between an edge IRB and an IRB carrying a feedback indication 315 in frequency fails to satisfy (e.g., is less than) a separation threshold (e.g., threshold frequency, which may refer to a threshold amount of separation in frequency, such as 1 MHz), according to one or more rules as described herein.

In some examples, depending on the RB-set configuration and an interlace index of the common interlace (e.g., when the common interlace is interlace #0), the UE 115 may refrain from dropping any additional signals 320 from any edge IRBs of the common interlace even if one or both edge IRBs are within the threshold frequency of a feedback indication 315 (e.g., an explicit no dropping rule). For example, under such an approach, the UE 115 may not drop either the lowest-frequency edge IRBs or the highest-frequency edge IRB of the common interlace, which may be located in the lowest-frequency and highest-frequency interlace clusters (e.g., a interlace cluster may refer to a group of contiguous PRBs that includes one IRB of each interlace, such as the five overall lowest-frequency IRBs or five overall highest-frequency IRBs in FIG. 3A) despite respective IRBs carrying a feedback indications 315 being within the threshold frequency of one or both edge IRBs.

Or, as an example, the UE 115 may determine whether to drop an edge IRB (e.g., if too near a feedback indication 315) based at least in part on a quantity of IRBs included in the common interlace. For example, if the common interlace includes less than a threshold quantity of IRBs (e.g., if the common interlace includes 10 IRBs), the UE 115 may follow a no dropping rule for edge IRBs according to which the UE 115 may not drop any edge IRB. But if the common interlace includes greater than a threshold quantity of IRBs (e.g., if the common interlace includes 11 or more IRBs), the UE 115 may be able to drop up to one of the edge IRBs (e.g., if an edge IRB is too near a feedback indication 315).

In some examples, the UE 115 may be able to drop up to one edge IRB of the common interlace (e.g., if too near a feedback indication 315) if the quantity of IRBs include in the common interlace satisfies a threshold quantity, such as described above. In other examples, the UE 115 may be able to drop up to one edge IRB of the common interlace (e.g., if too near a feedback indication 315) regardless of the quantity of IRBs include in the common interlace. And in other examples, the UE 115 may be able to drop up to one edge IRB of the common interlace (e.g., if too near a feedback indication 315) so long as the OCB threshold remains satisfied by the overall transmission (e.g., by the PSFCH 305-*a*). In examples in which the UE 115 is able to drop up to one edge IRB of the common interlace, if only one of the edge IRBs of the common interlace is within a threshold frequency of a feedback indication 315, then the UE 115 may drop that edge IRB. If both edge IRBs of the common interlace are within the threshold frequency of a respective feedback indication 315, then the UE 115 may drop the edge IRB that is nearest in frequency to the corresponding feedback indication 315, or (e.g., if the two edge IRBs are equally separated from the respective feedback indications 315) the UE 115 may drop the edge IRB that will result in maintaining a greater OCB (e.g., avoid dropping the edge IRB that would most reduce the OCB if dropped).

In some examples, the UE 115 may be able to drop up one or both edge IRBs (e.g., if too near a feedback indication 315) of the common interlace so long as the OCB threshold will remain satisfied by the overall transmission (e.g., by the PSFCH 305-*a*) after the dropping of the one or more edge IRBs. The interlace configuration 302 illustrates a sidelink feedback transmission via the PSFCH 305-*b*, which may include one or more interlaces, in accordance with such an example. For example, the PSFCH 305-*b* may include the common interlace at a first interlace index (e.g., interlace #0) and the configured interlace at a second interlace index (e.g., interlace #1). In some cases, a UE 115 may determine whether to drop an additional signal 320 of the common interlace based on whether an OCB 310-*b* of the PSFCH 305-*b* would satisfy an OCB threshold if the additional signal 320 was dropped. For example, the UE 115 may identify the OCB 310-*b* would span a first quantity of PRBs if an additional signal 320 were transmitted via the lowest-frequency (left-most in diagram) edge IRB and that the OCB 310-*b* would span a second quantity of PRBs if the additional signal 320 were dropped from the lowest-frequency edge IRB. If the second quantity of PRBs satisfies the OCB threshold of the PSFCH (e.g., 80% OCB), the UE 115 may drop the additional signal 320 at the edge IRB. Otherwise, if the second quantity of PRBs fails to satisfy the OCB threshold, the UE 115 may refrain from dropping additional signals 320 at edge IRBs of the common interlace.

In examples in which the UE 115 is able to drop up one or both edge IRBs of the common interlace (e.g., if too near a feedback indication 315) so long as the OCB threshold will remain satisfied by the overall transmission, if both edge IRBs of the common interlace are too near (e.g., within a threshold frequency range of) a respective feedback indication 315 and dropping both would cause the OCB threshold to become unsatisfied, then the UE 115 may drop one edge IRB so long as dropping the one edge IRB would maintain satisfaction of the OCB threshold. If dropping a first edge IRB while transmitting via a second IRB would maintain satisfaction of the OCB threshold, and dropping the second edge IRB while transmitting via the first IRB would cause the OCB threshold to be unsatisfied, then the UE 115 may drop the first edge IRB while transmitting via the second IRB. Or, if dropping either edge IRB of the common interlace while transmitting via the other edge IRB of the common interlace would maintain satisfaction of the OCB threshold, then the UE 115 may drop the edge IRB that is nearest in frequency to the corresponding feedback indication 315, or (e.g., if the two edge IRBs are equally separated from the respective feedback indications 315) the UE 115 may drop the edge IRB that will result in maintaining a greater OCB (e.g., avoid dropping the edge IRB that would most reduce the OCB if dropped).

Figures 4A, 4B:
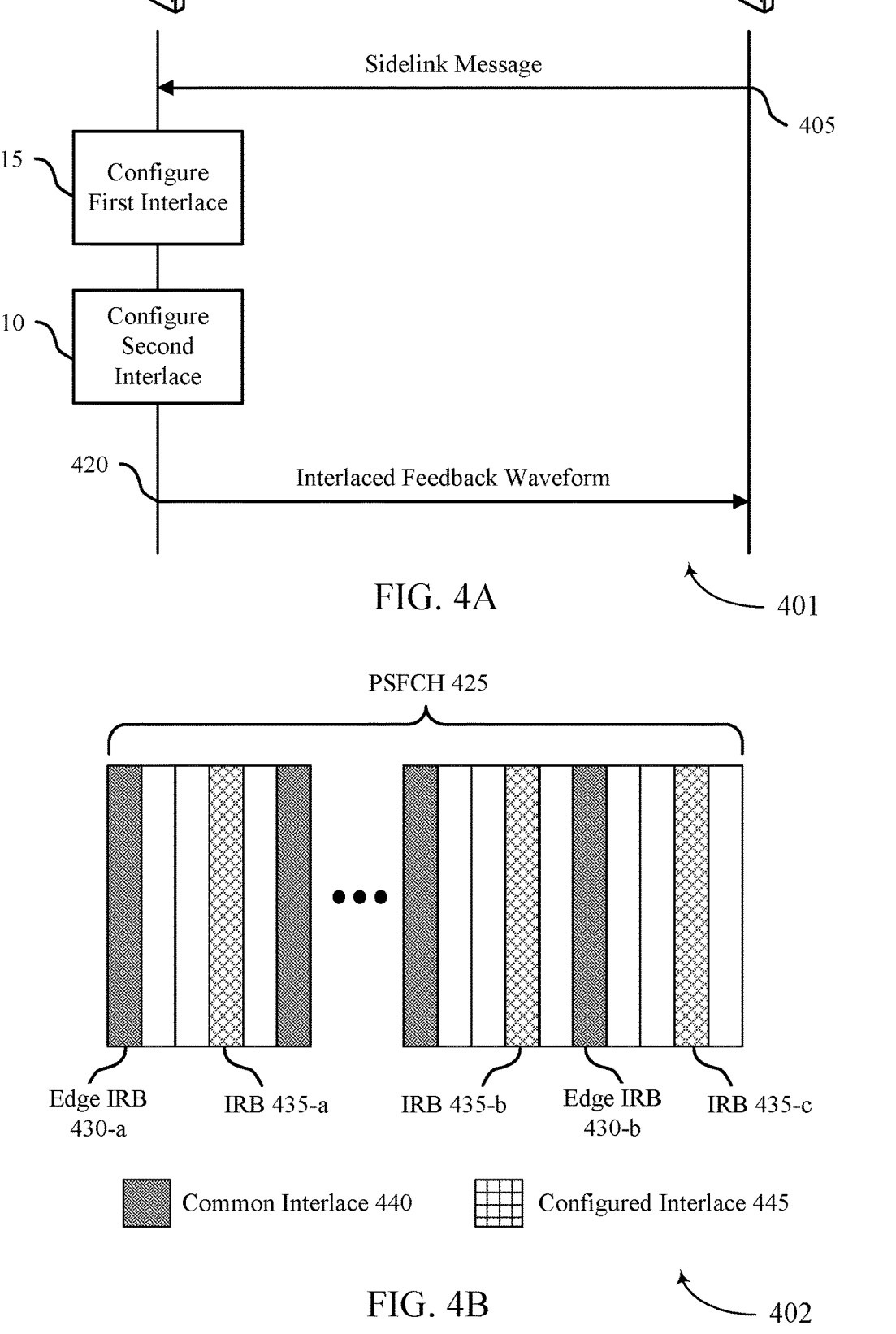
FIGS. 4A and 4B show an example of a process flow and an example of a corresponding interlace configuration that supports managing interlaced sidelink feedback in accordance with one or more aspects of the present disclosure.

FIGS. 4A and 4B show examples of a process flow 401 and an interlace configuration 402, respectively, that support managing interlaced sidelink feedback in accordance with one or more aspects of the present disclosure. The process flow 401 may implement, or be implemented by, one or more aspects of the wireless communications systems 100 and 200, as well as the interlace configurations 301 and 302. For example, the process flow 401 may be an example of signaling between a UE 115-*c* and a UE 115-*d*, which may be examples of sidelink UEs 115 described with reference to FIGS. 1 through 3B. Alternative examples of the following may be implemented, where some processes are performed in a different order than described or are not performed. In some cases, processes may include additional features not mentioned below, or further processes may be added.

At 405, the UE 115-*d* may transmit a sidelink message to the UE 115-*c*. For example, the UE 115-*c* may receive the sidelink message via a sidelink channel, which may be an example of a PSCCH or a PSSCH.

At 410, the UE 115-*c* may configure a first interlace of resources for indicating feedback. The first interlace of resources may be an example of a configured interlace (e.g., configured by a network device) occupied by the UE 115-*c* for transmitting feedback indications associated with the sidelink message. For example, the UE 115-*c* may configure one or more feedback indications for transmission via one or more first frequency resources within the first interlace of resources, which may include a set of multiple first frequency resources that are uniformly distributed in the frequency domain. Configured interlace 445 as illustrated in FIG. 4B may be an example of such a first interlace.

At 415, the UE 115-*c* may configure a second interlace of resources for transmitting additional signals. The second interlace may be an example of a common interlace (e.g., common to one or more UEs 115 including at least the UE 115-*c*) occupied by the UE 115-*c* for transmitting additional signals (e.g., noise signals, known information, dummy signals) to support satisfying an OCB threshold for a sidelink feedback channel. For example, the UE 115-*c* may configure one or more additional signals for transmission via one or more second frequency resources within the second interlace, which may include a set of multiple second frequency resources that are uniformly distributed in the frequency domain. In some cases, each first frequency resource within the first interlace may be offset, within the frequency domain, from a respective second frequency resource within the second interlace by a same quantity of one or more RBs. Common interlace 440 as illustrated in FIG. 4B may be an example of such a second interlace.

In some cases, the UE 115-*c* may determine, for at least one second frequency resource within the second interlace, whether to transmit an additional signal (e.g., a noise signal, a dummy signal, known information, non-useful information) via the at least one second frequency resource based on whether the at least one second frequency resource is an edge frequency resource within the second interlace (e.g., a lowest-frequency or highest-frequency resource within the second interlace, such as an edge IRB 430 within the common interlace 440). Further, the UE 115-*c* may determine whether to transmit a first additional signal of the one or more additional signals via the at least one second frequency resource based on whether a separation, in the frequency domain, between a first frequency resource carrying a first feedback indication (e.g., an IRB 435 within the configured interlace 445) and the at least one second frequency resource (e.g., an edge IRB 430 within the common interlace 440) satisfies a separation threshold (e.g., is within a threshold frequency or a quantity of RBs). In some cases, the separation threshold may correspond to a quantity of RBs in the frequency domain, a span in the frequency domain (e.g., 1 MHz), or both.

If the separation between the first frequency resource and the at least one second frequency resource fails to satisfy the separation threshold, the UE 115-*c* may transmit the first additional signal via the at least one second frequency resource, despite the separation between the first frequency resource and the at least one second frequency resource failing to satisfy the separation threshold, based on the at least one second frequency resource being an edge frequency resource (e.g., based on one or more rules as described herein that may cause the UE 115-*c* to refrain from dropping an edge IRB despite the edge IRB being near a feedback indication).

For example, with reference to FIG. 4B, the UE 115-*c* may transmit additional signaling via an edge IRB 430-*a* of a common interlace 440 despite an IRB 435-*a* of a configured interlace 445 carrying a feedback indication and being within the separation threshold (e.g., if operating according to a rule pursuant to which no edge IRB 430 may be dropped, or according to another rule as described herein that may result in the edge IRB 430-*a* not being dropped despite being separated in frequency from a feedback indication by less than a separation threshold).

As another example, if the at least one second frequency resource is an edge frequency resource and the separation between the first frequency resource and the at least one second frequency resource fails to satisfy the separation threshold, the UE 115-*c* may drop the first additional signal based on the separation between the first frequency resource and the at least one second frequency resource failing to satisfy the separation threshold and further based on transmitting a second additional signal via another edge frequency resource of the second interlace (e.g., if operating according to a rule pursuant to which at most one edge IRB 430 may be dropped). That is, for example, if a second feedback indication of the one or more feedback indications is configured for transmission via another first frequency resource within the first interlace and a separation, in the frequency domain, between the other first frequency resource and another edge frequency resource fails to satisfy the separation threshold, the UE 115-*c* may transmit the second additional signal via the other edge frequency resource of the second interlace, despite the separation between the other first frequency resource and other edge frequency resource failing to satisfy the separation threshold, based on the first additional signal being dropped.

Such examples may be understood with reference to FIG. 4B, for example. If the UE 115-*c* is able to drop at most one edge IRB 430 and the UE is to transmit feedback indications via both IRBs 435-*a* and 435-*b* of the configured interlace 445, the UE 115-*c* may drop an additional signal configured for transmission via the edge IRB 430-*b* of the common interlace 440 based on the separation between the edge IRB 430-*b* and the IRB 435-*b* failing to satisfy the separation threshold and further based on transmitting a second additional signal via the edge IRB 430-*a* (e.g., because the edge IRB 430-*a* is further separated from the IRB 435-*a* relative to the separation between the edge IRB 430-*b* and IRB 435-*b*, or because dropping the edge IRB 430-*b* would have lesser impact on the OCB of the PSFCH 425, the UE 115-*c* may choose to drop the edge IRB 430-*b* and to not drop the edge IRB 430-*a*). In other words, if both the edge IRB 430-*a* and the edge IRB 430-*b* are within the separation threshold of a feedback indication, the UE 115-*c* may drop at most one of either the edge IRB 430-*a* or the edge IRB 430-*b* (e.g., while transmitting via the other edge IRB 430 that is not dropped).

In some examples, if the at least one second frequency resource is an edge frequency resource, the UE 115-*c* may drop the first additional signal based on the one or more first frequency resources within the first interlace and the one or more second frequency resources within the second interlace, excluding (e.g., not including, apart from, other than) the at least one second frequency resource, spanning a first bandwidth that satisfies a second threshold (e.g., an OCB threshold). That is, for example, if the separation between the first frequency resource and the at least one second frequency resource fails to satisfy the separation threshold and the at least one second frequency resource comprises an edge frequency resource, the UE 115-*c* may transmit the first additional signal via the at least one second frequency resource, despite the separation between the first frequency resource and the at least one second frequency resource failing to satisfy the separation threshold, based on the one or more first frequency resources within the first interlace and the one or more other second frequency resources within the second interlace (e.g., those second frequency resources within the second interlace other than the at least one second frequency resource) spanning a first bandwidth that fails to satisfy the second threshold. Or, conversely, if the separation between the first frequency resource and the at least one second frequency resource fails to satisfy the separation threshold and the at least one second frequency resource comprises an edge frequency resource, the UE 115-*c* may drop the first additional signal from the at least one second frequency resource, based on the separation between the first frequency resource and the at least one second frequency resource failing to satisfy the separation threshold, and further based on the one or more first frequency resources within the first interlace and the one or more other second frequency resources within the second interlace (e.g., those second frequency resources within the second interlace other than the at least one second frequency resource) spanning a first bandwidth that satisfies the second threshold. In some cases, the second threshold may be a percentage of a second bandwidth associated with the sidelink feedback channel (e.g., an OCB threshold).

Such examples may be understood with reference to FIG. 4B. For example, the UE 115-*c* may drop an additional signal configured for transmission via the edge IRB 430-*a* if the UE 115-*c* identifies that a span of the other (e.g., remaining) frequency resources of the common interlace 440, along with the configured interlace 445, satisfy an OCB threshold. For example, the UE 115-*c* may identify that a frequency span between the IRB 435-*a* of the configured interlace 445 (e.g., a lowest-frequency feedback indication) and the other edge IRB 430-*b* of the common interlace 440 satisfies an OCB requirement for the PSFCH 425, and thus may drop an additional signal from the edge IRB 430-*a*. Or, if the frequency span between the IRB 435-*a* of the configured interlace 445 frequency span and the other edge IRB 430-*b* of the common interlace does not satisfy the OCB requirement for the PSFCH 425, then the UE 115-*c* may transmit additional signaling via the edge IRB 430-*a* (e.g., may not drop the edge IRB 430-*b*) in order to maintain the OCB requirement as satisfied. In other words, the UE 115-*c* may drop an edge IRB 430 if an OCB threshold of the PSFCH 425 will still be satisfied despite the edge IRB 430 being dropped; otherwise, the UE 115-*c* may transmit via the edge IRB 430 despite the edge IRB 430 being within a threshold frequency separation of a feedback indication.

At 420, the UE 115-*c* may transmit an interlaced feedback waveform (e.g., PSFCH 425) indicating feedback in response to the sidelink message. For example, the UE 115-*c* may transmit the one or more feedback indications associated with the sidelink message via the one or more first frequency resources of the first interlace and may transmit, concurrent with transmitting the one or more of feedback indications, the one or more additional signals via the one or more second frequency resources of the second interlace (e.g., after determining whether to drop any additional signals from one or more edge IRBs 430).

Figure 5:
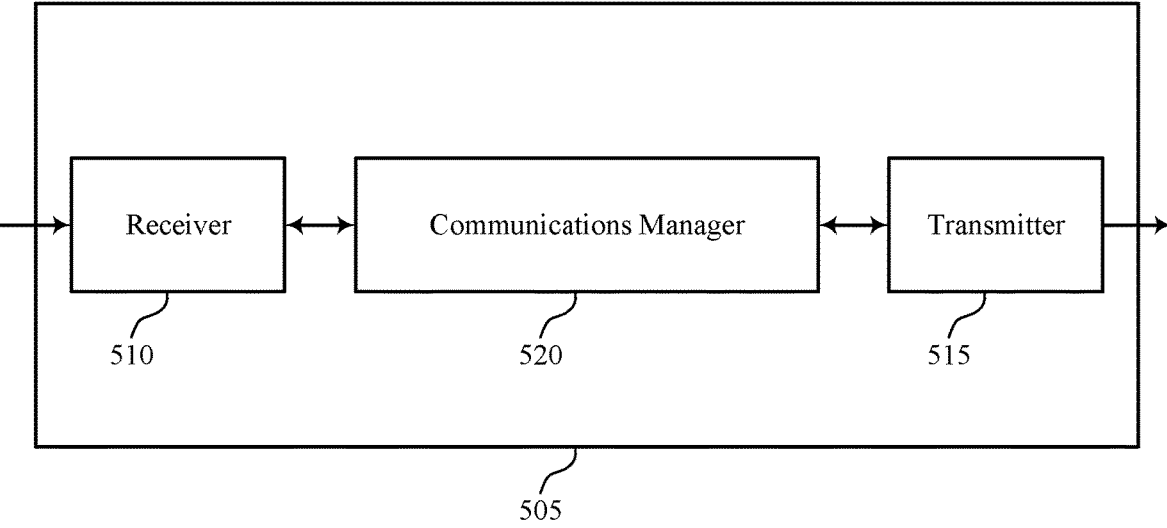
FIGS. 5 and 6 show block diagrams of devices that support managing interlaced sidelink feedback in accordance with one or more aspects of the present disclosure.

FIG. 5 shows a block diagram 500 of a device 505 that supports managing interlaced sidelink feedback in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to managing interlaced sidelink feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to managing interlaced sidelink feedback). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of managing interlaced sidelink feedback as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving, from a second UE, a sidelink message via a sidelink channel. The communications manager 520 is capable of, configured to, or operable to support a means for transmitting, to the second UE via a sidelink feedback channel, one or more feedback indications associated with the sidelink message via one or more first frequency resources within a first interlace of resources, the first interlace including a set of multiple first frequency resources that are uniformly distributed in a frequency domain. The communications manager 520 is capable of, configured to, or operable to support a means for transmitting, to the second UE via the sidelink feedback channel and concurrent with transmitting the one or more feedback indications, one or more additional signals via one or more second frequency resources within a second interlace, the second interlace including a set of multiple second frequency resources that are uniformly distributed in the frequency domain, where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for enhanced interlaced feedback waveforms by reducing occurrences of the feedback waveform failing to satisfy an OCB threshold of a sidelink feedback channel, thereby improving sidelink communications.

Figure 6:
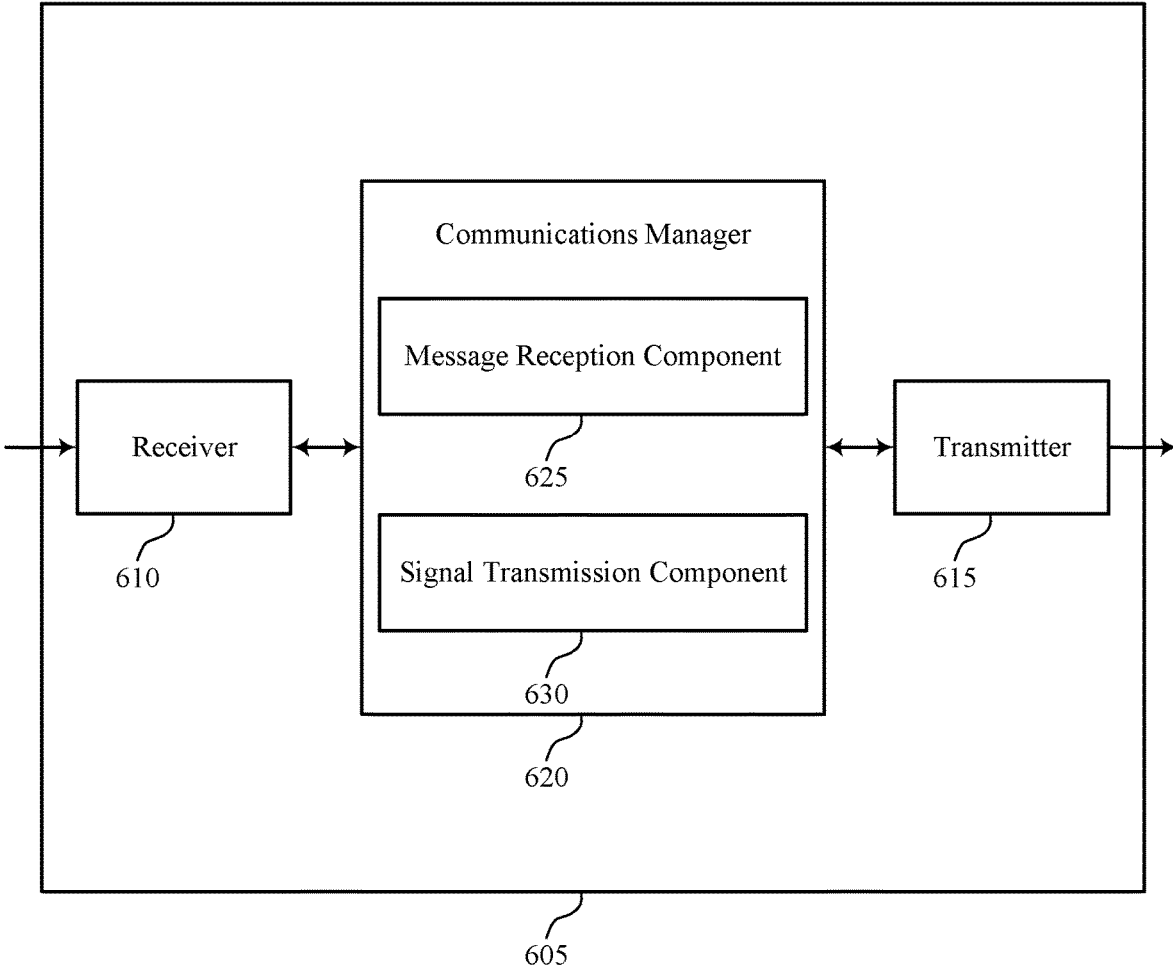

FIG. 6 shows a block diagram 600 of a device 605 that supports managing interlaced sidelink feedback in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to managing interlaced sidelink feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to managing interlaced sidelink feedback). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of managing interlaced sidelink feedback as described herein. For example, the communications manager 620 may include a message reception component 625 a signal transmission component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The message reception component 625 is capable of, configured to, or operable to support a means for receiving, from a second UE, a sidelink message via a sidelink channel. The signal transmission component 630 is capable of, configured to, or operable to support a means for transmitting, to the second UE via a sidelink feedback channel, one or more feedback indications associated with the sidelink message via one or more first frequency resources within a first interlace of resources, the first interlace including a set of multiple first frequency resources that are uniformly distributed in a frequency domain. The signal transmission component 630 is capable of, configured to, or operable to support a means for transmitting, to the second UE via the sidelink feedback channel and concurrent with transmitting the one or more feedback indications, one or more additional signals via one or more second frequency resources within a second interlace, the second interlace including a set of multiple second frequency resources that are uniformly distributed in the frequency domain, where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace.

Figure 7:
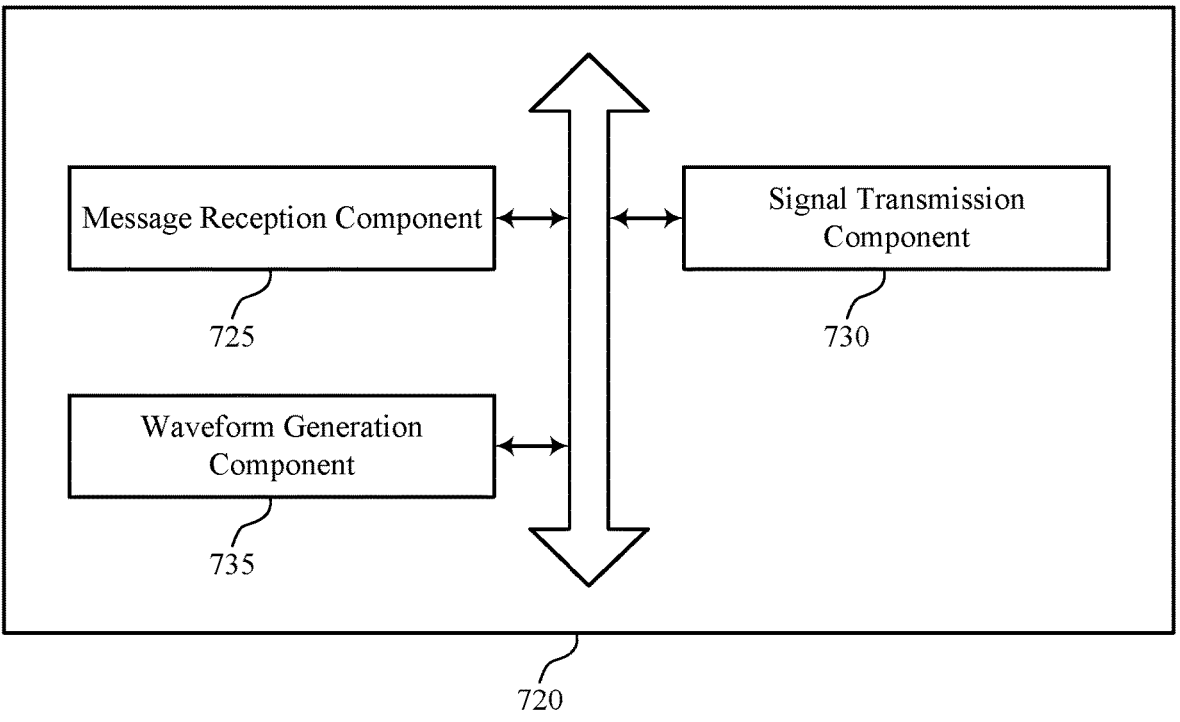
FIG. 7 shows a block diagram of a communications manager that supports managing interlaced sidelink feedback in accordance with one or more aspects of the present disclosure.

FIG. 7 shows a block diagram 700 of a communications manager 720 that supports managing interlaced sidelink feedback in accordance with one or more aspects of the present disclosure. The communications manager 720 may be an example of aspects of a communications manager 520, a communications manager 620, or both, as described herein. The communications manager 720, or various components thereof, may be an example of means for performing various aspects of managing interlaced sidelink feedback as described herein. For example, the communications manager 720 may include a message reception component 725, a signal transmission component 730, a waveform generation component 735, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The message reception component 725 is capable of, configured to, or operable to support a means for receiving, from a second UE, a sidelink message via a sidelink channel. The signal transmission component 730 is capable of, configured to, or operable to support a means for transmitting, to the second UE via a sidelink feedback channel, one or more feedback indications associated with the sidelink message via one or more first frequency resources within a first interlace of resources, the first interlace including a set of multiple first frequency resources that are uniformly distributed in a frequency domain. In some examples, the signal transmission component 730 is capable of, configured to, or operable to support a means for transmitting, to the second UE via the sidelink feedback channel and concurrent with transmitting the one or more feedback indications, one or more additional signals via one or more second frequency resources within a second interlace, the second interlace including a set of multiple second frequency resources that are uniformly distributed in the frequency domain, where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace.

In some examples, to support transmitting the one or more feedback indications and the one or more additional signals, the signal transmission component 730 is capable of, configured to, or operable to support a means for transmitting a first feedback indication of the one or more feedback indications via a first frequency resource within the first interlace. In some examples, to support transmitting the one or more feedback indications and the one or more additional signals, the waveform generation component 735 is capable of, configured to, or operable to support a means for determining whether to transmit a first additional signal of the one or more additional signals via the at least one second frequency resource within the second interlace based on whether a separation, in the frequency domain, between the first frequency resource and the at least one second frequency resource satisfies a separation threshold.

In some examples, the separation between the first frequency resource and the at least one second frequency resource fails to satisfy the separation threshold, and the signal transmission component 730 is capable of, configured to, or operable to support a means for transmitting the first additional signal via the at least one second frequency resource, despite the separation between the first frequency resource and the at least one second frequency resource failing to satisfy the separation threshold, based on the at least one second frequency resource including the edge frequency resource.

In some examples, the at least one second frequency resource includes the edge resource, and the waveform generation component 735 is capable of, configured to, or operable to support a means for dropping the first additional signal based on the separation between the first frequency resource and the at least one second frequency resource failing to satisfy the separation threshold and further based on transmitting a second additional signal via another edge frequency resource of the second interlace.

In some examples, a second feedback indication of the one or more feedback indications may be transmitted via another first frequency resource within the first interlace, and a separation, in the frequency domain, between the other first frequency resource and the other edge frequency resource may fail to satisfy the separation threshold. The signal transmission component 730 is capable of, configured to, or operable to support a means for transmitting, in such scenarios, the second additional signal via the other edge frequency resource of the second interlace, despite the separation between the other first frequency resource and other edge frequency resource failing to satisfy the separation threshold, occurs based on the first additional signal being dropped.

In some examples, the at least one second frequency resource includes the edge frequency resource, and the waveform generation component 735 is capable of, configured to, or operable to support a means for dropping the first additional signal based on the one or more first frequency resources within the first interlace and the one or more second frequency resources within the second interlace, excluding the at least one second frequency resource, spanning a first bandwidth that satisfies a second threshold.

In some examples, the second threshold includes a percentage of a second bandwidth associated with the sidelink feedback channel.

In some examples, the separation between the first frequency resource and the at least one second frequency resource fails to satisfy the separation threshold, and the signal transmission component 730 is capable of, configured to, or operable to support a means for transmitting the first additional signal via the at least one second frequency resource, despite the separation between the first frequency resource and the at least one second frequency resource failing to satisfy the separation threshold, based on the one or more first frequency resources within the first interlace and the one or more second frequency resources within the second interlace, excluding the at least one second frequency resource, spanning a first bandwidth that fails to satisfy a second threshold.

In some examples, the second threshold includes a percentage of a second bandwidth associated with the sidelink feedback channel.

In some examples, the waveform generation component 735 is capable of, configured to, or operable to support a means for dropping the first additional signal based on the separation between the first frequency resource and the at least one second frequency resource failing to satisfy the separation threshold and further based on the at least one second frequency resource not including the edge frequency resource.

In some examples, the separation threshold includes a quantity of one or more resource blocks in the frequency domain, a span in the frequency domain, or both.

In some examples, each first frequency resource within the first interlace is offset, within the frequency domain, from a respective second frequency resource within the second interlace by a same quantity of one or more resource blocks.

In some examples, the second interlace is common to one or more UEs, the one or more UEs including at least the first UE.

In some examples, the one or more additional signals include noise signals.

Figure 8:
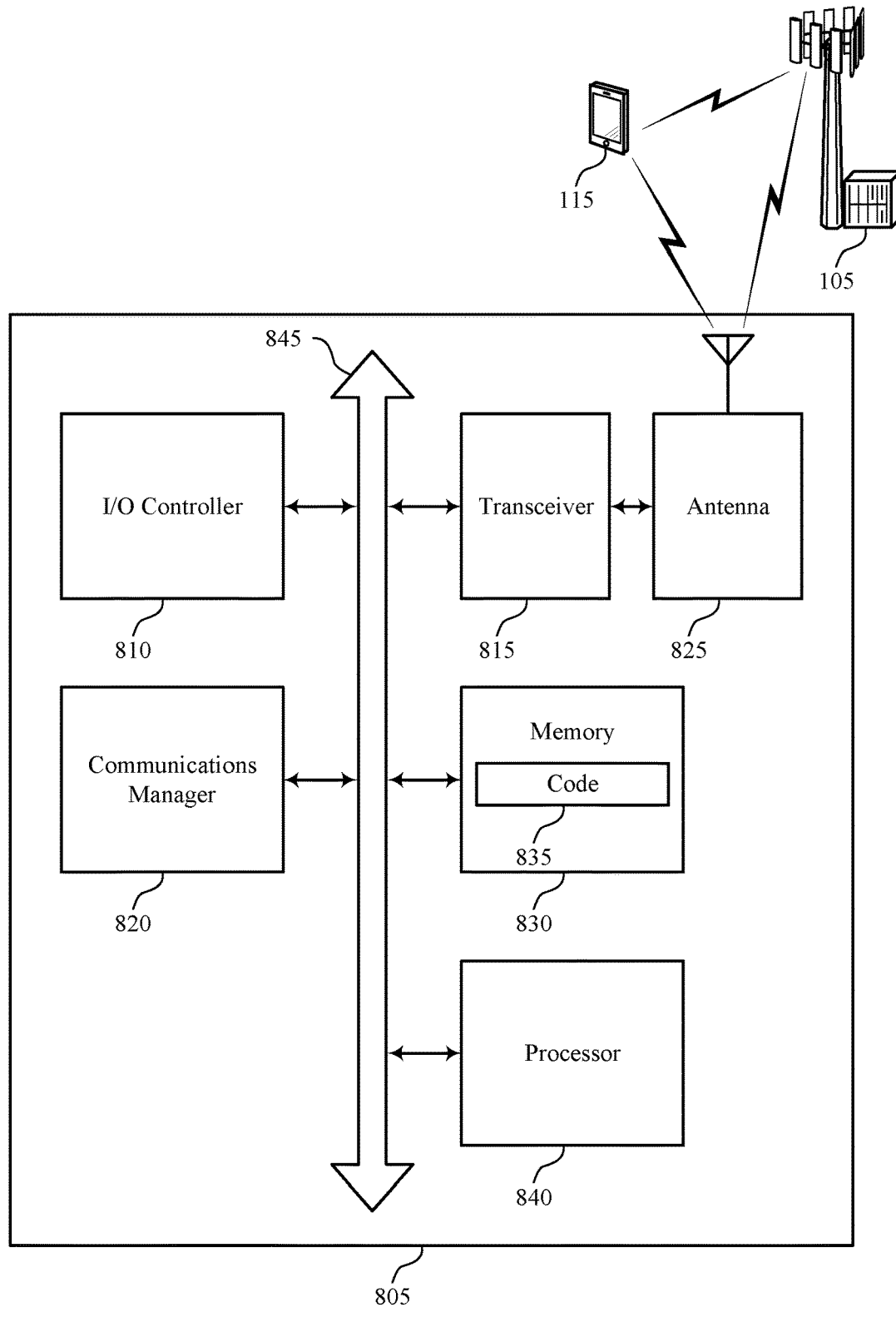
FIG. 8 shows a diagram of a system including a device that supports managing interlaced sidelink feedback in accordance with one or more aspects of the present disclosure.

FIG. 8 shows a diagram of a system 800 including a device 805 that supports managing interlaced sidelink feedback in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting managing interlaced sidelink feedback). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications in accordance with examples as disclosed herein. For example, the communications manager 820 is capable of, configured to, or operable to support a means for receiving, from a second UE, a sidelink message via a sidelink channel. The communications manager 820 is capable of, configured to, or operable to support a means for transmitting, to the second UE via a sidelink feedback channel, one or more feedback indications associated with the sidelink message via one or more first frequency resources within a first interlace of resources, the first interlace including a set of multiple first frequency resources that are uniformly distributed in a frequency domain. The communications manager 820 is capable of, configured to, or operable to support a means for transmitting, to the second UE via the sidelink feedback channel and concurrent with transmitting the one or more feedback indications, one or more additional signals via one or more second frequency resources within a second interlace, the second interlace including a set of multiple second frequency resources that are uniformly distributed in the frequency domain, where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace.

By including or configuring the communications manager 820 in accordance with examples as described herein, the device 805 may support techniques for enhanced interlaced feedback waveforms by reducing occurrences of the feedback waveform failing to satisfy an OCB threshold of a sidelink feedback channel, thereby improving sidelink communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of managing interlaced sidelink feedback as described herein, or the at least one processor 840 and the at least one memory 830 may be otherwise configured to, individually or collectively, perform or support such operations.

FIG. 9 shows a flowchart illustrating a method 900 that supports managing interlaced sidelink feedback in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving, from a second UE, a sidelink message via a sidelink channel. The operations of block 905 may be performed in accordance with examples as disclosed herein. In some examples, aspects of the operations of 905 may be performed by a message reception component 725 as described with reference to FIG. 7.

At 910, the method may include transmitting, to the second UE via a sidelink feedback channel, one or more feedback indications associated with the sidelink message via one or more first frequency resources within a first interlace of resources, the first interlace including a set of multiple first frequency resources that are uniformly distributed in a frequency domain. The operations of block 910 may be performed in accordance with examples as disclosed herein. In some examples, aspects of the operations of 910 may be performed by a signal transmission component 730 as described with reference to FIG. 7.

At 915, the method may include transmitting, to the second UE via the sidelink feedback channel and concurrent with transmitting the one or more feedback indications, one or more additional signals via one or more second frequency resources within a second interlace, the second interlace including a set of multiple second frequency resources that are uniformly distributed in the frequency domain, where for at least one second frequency resource within the second interlace, whether the additional signaling is transmitted via the at least one second frequency resource is based on whether the at least one second frequency resource includes an edge frequency resource within the second interlace, the edge frequency resource including a lowest-frequency or highest-frequency resource within the second interlace. The operations of block 915 may be performed in accordance with examples as disclosed herein. In some examples, aspects of the operations of 915 may be performed by a signal transmission component 730 as described with reference to FIG. 7.

The following provides an overview of aspects of the present disclosure:

Aspect 1: A method for wireless communications by a first UE, comprising: receiving, from a second UE, a sidelink message via a sidelink channel; transmitting, to the second UE via a sidelink feedback channel, one or more feedback indications associated with the sidelink message via one or more first frequency resources within a first interlace of resources, the first interlace comprising a plurality of first frequency resources that are uniformly distributed in a frequency domain; and transmitting, to the second UE via the sidelink feedback channel and concurrent with transmitting the one or more of feedback indications, one or more additional signals via one or more second frequency resources within a second interlace, the second interlace comprising a plurality of second frequency resources that are uniformly distributed in the frequency domain, wherein for at least one second frequency resource within the second interlace, whether the additional signaling is transmitted via the at least one second frequency resource is based at least in part on whether the at least one second frequency resource comprises an edge frequency resource within the second interlace, the edge frequency resource comprising a lowest-frequency or highest-frequency resource within the second interlace.

Aspect 2: The method of aspect 1, wherein transmitting the one or more feedback indications and the one or more additional signals comprises: transmitting a first feedback indication of the one or more feedback indications via a first frequency resource within the first interlace; and determining whether to transmit a first additional signal of the one or more additional signals via the at least one second frequency resource within the second interlace based at least in part on whether a separation, in the frequency domain, between the first frequency resource and the second frequency resource satisfies a separation threshold.

Aspect 3: The method of aspect 2, wherein the separation between the first frequency resource and the at least one second frequency resource fails to satisfy the separation threshold, the method further comprising: transmitting the first additional signal via the at least one second frequency resource, despite the separation between the first frequency resource and the second frequency resource failing to satisfy the separation threshold, based at least in part on the at least one second frequency resource comprising the edge frequency resource.

Aspect 4: The method of any of aspects 2 through 3, wherein the at least one second frequency resource comprises the edge resource, and wherein the separation between the first frequency resource and the second frequency resource fails to satisfy the separation threshold, the method further comprising: dropping the first additional signal based at least in part on the separation between the first frequency resource and the second frequency resource failing to satisfy the separation threshold and further based at least in part on transmitting a second additional signal via another edge frequency resource of the second interlace.

Aspect 5: The method of aspect 4, wherein a second feedback indication of the one or more feedback indications is transmitted via another first frequency resource within the first interlace; a separation, in the frequency domain, between the other first frequency resource and the other edge frequency resource fails to satisfy the separation threshold; and transmitting the second additional signal via the other edge frequency resource of the second interlace, despite the separation between the other first frequency resource and other edge frequency resource failing to satisfy the separation threshold, occurs based at least in part on the first additional signal being dropped.

Aspect 6: The method of any of aspects 2 through 5, wherein the at least one second frequency resource comprises the edge frequency resource, the method further comprising: dropping the first additional signal based at least in part on the one or more first frequency resources within the first interlace and the one or more second frequency resources within the second interlace, excluding the at least one second frequency resource, spanning a first bandwidth that satisfies a second threshold.

Aspect 7: The method of aspect 6, wherein the second threshold comprises a percentage of a second bandwidth associated with the sidelink feedback channel.

Aspect 8: The method of any of aspects 2 through 5, wherein the separation between the first frequency resource and the at least one second frequency resource fails to satisfy the separation threshold, and wherein the at least one second frequency resource comprises the edge frequency resource, the method further comprising: transmitting the first additional signal via the at least one second frequency resource, despite the separation between the first frequency resource and the second frequency resource failing to satisfy the separation threshold, based at least in part on the one or more first frequency resources within the first interlace and the one or more second frequency resources within the second interlace, excluding the at least one second frequency resource, spanning a first bandwidth that fails to satisfy a second threshold.

Aspect 9: The method of aspect 8, wherein the second threshold comprises a percentage of a second bandwidth associated with the sidelink feedback channel.

Aspect 10: The method of any of aspects 2 through 9, further comprising: dropping the first additional signal based at least in part on the separation between the first frequency resource and the second frequency resource failing to satisfy the separation threshold and further based at least in part on the at least one second frequency resource not comprising the edge frequency resource.

Aspect 11: The method of any of aspects 2 through 10, wherein the separation threshold comprises a quantity of one or more resource blocks in the frequency domain, a span in the frequency domain, or both.

Aspect 12: The method of any of aspects 1 through 11, wherein each first frequency resource within the first interlace is offset, within the frequency domain, from a respective second frequency resource within the second interlace by a same quantity of one or more resource blocks.

Aspect 13: The method of any of aspects 1 through 12, wherein the second interlace is common to one or more UEs, the one or more UEs comprising at least the first UE.

Aspect 14: The method of any of aspects 1 through 13, wherein the one or more additional signals comprise noise signals.

Aspect 15: A first UE for wireless communications, comprising one or more memories storing processor-executable code, and one or more processors coupled with the one or more memories and individually or collectively operable to execute the code to cause the first UE to perform a method of any of aspects 1 through 14.

Aspect 16: A first UE for wireless communications, comprising at least one means for performing a method of any of aspects 1 through 14.

Aspect 17: A non-transitory computer-readable medium storing code for wireless communications, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer.

By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
one or more memories storing processor-executable code; and
one or more processors coupled with the one or more memories and individually or collectively operable to execute the code to cause the first UE to:
receive, from a second UE, a sidelink message via a sidelink channel;
transmit, to the second UE via a sidelink feedback channel, one or more feedback indications associated with the sidelink message via one or more first frequency resources within a first interlace of resources, the first interlace comprising a plurality of first frequency resources that are uniformly distributed in a frequency domain; and
transmit, to the second UE via the sidelink feedback channel and concurrent with transmitting the one or more feedback indications, one or more additional signals via one or more second frequency resources within a second interlace, the second interlace comprising a plurality of second frequency resources that are uniformly distributed in the frequency domain, wherein for at least one second frequency resource within the second interlace, whether the additional signaling is transmitted via the at least one second frequency resource is based at least in part on whether the at least one second frequency resource comprises an edge frequency resource within the second interlace, the edge frequency resource comprising a lowest-frequency or highest-frequency resource within the second interlace.

2. The first UE of claim 1, wherein, to transmit the one or more feedback indications and the one or more additional signals, the one or more processors are individually or collectively operable to execute the code to cause the first UE to:
transmit a first feedback indication of the one or more feedback indications via a first frequency resource within the first interlace; and
determine whether to transmit a first additional signal of the one or more additional signals via the at least one second frequency resource within the second interlace based at least in part on whether a separation, in the frequency domain, between the first frequency resource and the at least one second frequency resource satisfies a separation threshold.

3. The first UE of claim 2, wherein, when the separation between the first frequency resource and the at least one second frequency resource fails to satisfy the separation threshold, the one or more processors are individually or collectively further operable to execute the code to cause the first UE to:
transmit the first additional signal via the at least one second frequency resource, despite the separation between the first frequency resource and the at least one second frequency resource failing to satisfy the separation threshold, based at least in part on the at least one second frequency resource comprising the edge frequency resource.

4. The first UE of claim 2, wherein, when the at least one second frequency resource comprises the edge resource, the one or more processors are individually or collectively further operable to execute the code to cause the first UE to:
drop the first additional signal based at least in part on the separation between the first frequency resource and the at least one second frequency resource failing to satisfy the separation threshold and further based at least in part on transmitting a second additional signal via another edge frequency resource of the second interlace.

5. The first UE of claim 4, wherein, when a second feedback indication of the one or more feedback indications is transmitted via another first frequency resource within the first interlace and a separation, in the frequency domain, between the other first frequency resource and the other edge frequency resource fails to satisfy the separation threshold, the one or more processors are individually or collectively further operable to execute the code to cause the first UE to:
transmit the second additional signal via the other edge frequency resource of the second interlace, despite the separation between the other first frequency resource and other edge frequency resource failing to satisfy the separation threshold, based at least in part on the first additional signal being dropped.

6. The first UE of claim 2, wherein, when the at least one second frequency resource comprises the edge frequency resource, the one or more processors are individually or collectively further operable to execute the code to cause the first UE to:
drop the first additional signal based at least in part on the one or more first frequency resources within the first interlace and the one or more second frequency resources within the second interlace, excluding the at least one second frequency resource, spanning a first bandwidth that satisfies a second threshold.

7. The first UE of claim 6, wherein the second threshold comprises a percentage of a second bandwidth associated with the sidelink feedback channel.

8. The first UE of claim 2, wherein, when the separation between the first frequency resource and the at least one second frequency resource fails to satisfy the separation threshold, the one or more processors are individually or collectively further operable to execute the code to cause the first UE to:

transmit the first additional signal via the at least one second frequency resource, despite the separation between the first frequency resource and the at least one second frequency resource failing to satisfy the separation threshold, based at least in part on the one or more first frequency resources within the first interlace and the one or more second frequency resources within the second interlace, excluding the at least one second frequency resource, spanning a first bandwidth that fails to satisfy a second threshold.

9. The first UE of claim 8, wherein the second threshold comprises a percentage of a second bandwidth associated with the sidelink feedback channel.

10. The first UE of claim 2, wherein the one or more processors are individually or collectively further operable to execute the code to cause the first UE to:

drop the first additional signal based at least in part on the separation between the first frequency resource and the at least one second frequency resource failing to satisfy the separation threshold and further based at least in part on the at least one second frequency resource not comprising the edge frequency resource.

11. The first UE of claim 2, wherein the separation threshold comprises a quantity of one or more resource blocks in the frequency domain, a span in the frequency domain, or both.

12. The first UE of claim 1, wherein each first frequency resource within the first interlace is offset, within the frequency domain, from a respective second frequency resource within the second interlace by a same quantity of one or more resource blocks.

13. The first UE of claim 1, wherein the second interlace is common to one or more UEs, the one or more UEs comprising at least the first UE.

14. The first UE of claim 1, wherein:

the one or more additional signals comprise noise signals.

15. A method for wireless communications by a first user equipment (UE), comprising:

receiving, from a second UE, a sidelink message via a sidelink channel;

transmitting, to the second UE via a sidelink feedback channel, one or more feedback indications associated with the sidelink message via one or more first frequency resources within a first interlace of resources, the first interlace comprising a plurality of first frequency resources that are uniformly distributed in a frequency domain; and transmitting, to the second UE via the sidelink feedback channel and concurrent with transmitting the one or more feedback indications, one or more additional signals via one or more second frequency resources within a second interlace, the second interlace comprising a plurality of second frequency resources that are uniformly distributed in the frequency domain, wherein for at least one second frequency resource within the second interlace, whether the additional signaling is transmitted via the at least one second frequency resource is based at least in part on whether the at least one second frequency resource comprises an edge frequency resource within the second interlace, the edge frequency resource comprising a lowest-frequency or highest-frequency resource within the second interlace.

16. The method of claim 15, wherein transmitting the one or more feedback indications and the one or more additional signals comprises:

transmitting a first feedback indication of the one or more feedback indications via a first frequency resource within the first interlace; and determining whether to transmit a first additional signal of the one or more additional signals via the at least one second frequency resource within the second interlace based at least in part on whether a separation, in the frequency domain, between the first frequency resource and the at least one second frequency resource satisfies a separation threshold.

17. The method of claim 16, wherein the separation between the first frequency resource and the at least one second frequency resource fails to satisfy the separation threshold, the method further comprising:

transmitting the first additional signal via the at least one second frequency resource, despite the separation between the first frequency resource and the at least one second frequency resource failing to satisfy the separation threshold, based at least in part on the at least one second frequency resource comprising the edge frequency resource.

18. The method of claim 16, wherein the at least one second frequency resource comprises the edge resource, and wherein the separation between the first frequency resource and the at least one second frequency resource fails to satisfy the separation threshold, the method further comprising:

dropping the first additional signal based at least in part on the separation between the first frequency resource and the at least one second frequency resource failing to satisfy the separation threshold and further based at least in part on transmitting a second additional signal via another edge frequency resource of the second interlace.

19. The method of claim 18, wherein:

a second feedback indication of the one or more feedback indications is transmitted via another first frequency resource within the first interlace;

a separation, in the frequency domain, between the other first frequency resource and the other edge frequency resource fails to satisfy the separation threshold; and transmitting the second additional signal via the other edge frequency resource of the second interlace, despite the separation between the other first frequency resource and other edge frequency resource failing to satisfy the separation threshold, occurs based at least in part on the first additional signal being dropped.

20. The method of claim 16, wherein the at least one second frequency resource comprises the edge frequency resource, the method further comprising:

dropping the first additional signal based at least in part on the one or more first frequency resources within the first interlace and the one or more second frequency resources within the second interlace, excluding the at least one second frequency resource, spanning a first bandwidth that satisfies a second threshold.

21. The method of claim 20, wherein the second threshold comprises a percentage of a second bandwidth associated with the sidelink feedback channel.

22. The method of claim 16, wherein the separation between the first frequency resource and the at least one second frequency resource fails to satisfy the separation threshold, and wherein the at least one second frequency resource comprises the edge frequency resource, the method further comprising:

transmitting the first additional signal via the at least one second frequency resource, despite the separation between the first frequency resource and the at least one second frequency resource failing to satisfy the separation threshold, based at least in part on the one or more first frequency resources within the first interlace and the one or more second frequency resources within the second interlace, excluding the at least one second frequency resource, spanning a first bandwidth that fails to satisfy a second threshold.

23. The method of claim 22, wherein the second threshold comprises a percentage of a second bandwidth associated with the sidelink feedback channel.

24. The method of claim 16, further comprising:

dropping the first additional signal based at least in part on the separation between the first frequency resource and the at least one second frequency resource failing to satisfy the separation threshold and further based at least in part on the at least one second frequency resource not comprising the edge frequency resource.

25. The method of claim 16, wherein the separation threshold comprises a quantity of one or more resource blocks in the frequency domain, a span in the frequency domain, or both.

26. The method of claim 15, wherein each first frequency resource within the first interlace is offset, within the frequency domain, from a respective second frequency resource within the second interlace by a same quantity of one or more resource blocks.

27. The method of claim 15, wherein the second interlace is common to one or more UEs, the one or more UEs comprising at least the first UE.

28. The method of claim 15, wherein the one or more additional signals comprise noise signals.

29. A first user equipment (UE) for wireless communications, comprising:

means for receiving, from a second UE, a sidelink message via a sidelink channel;

means for transmitting, to the second UE via a sidelink feedback channel, one or more feedback indications associated with the sidelink message via one or more first frequency resources within a first interlace of resources, the first interlace comprising a plurality of first frequency resources that are uniformly distributed in a frequency domain; and means for transmitting, to the second UE via the sidelink feedback channel and concurrent with transmitting the one or more feedback indications, one or more additional signals via one or more second frequency resources within a second interlace, the second interlace comprising a plurality of second frequency resources that are uniformly distributed in the frequency domain, wherein for at least one second frequency resource within the second interlace, whether the additional signaling is transmitted via the at least one second frequency resource is based at least in part on whether the at least one second frequency resource comprises an edge frequency resource within the second interlace, the edge frequency resource comprising a lowest-frequency or highest-frequency resource within the second interlace.

30. A non-transitory computer-readable medium storing code for wireless communications by a first user equipment (UE), the code comprising instructions executable by one or more processors to:

receive, from a second UE, a sidelink message via a sidelink channel;

transmit, to the second UE via a sidelink feedback channel, one or more feedback indications associated with the sidelink message via one or more first frequency resources within a first interlace of resources, the first interlace comprising a plurality of first frequency resources that are uniformly distributed in a frequency domain; and transmit, to the second UE via the sidelink feedback channel and concurrent with transmitting the one or more feedback indications, one or more additional signals via one or more second frequency resources within a second interlace, the second interlace comprising a plurality of second frequency resources that are uniformly distributed in the frequency domain, wherein for at least one second frequency resource within the second interlace, whether the additional signaling is transmitted via the at least one second frequency resource is based at least in part on whether the at least one second frequency resource comprises an edge frequency resource within the second interlace, the edge frequency resource comprising a lowest-frequency or highest-frequency resource within the second interlace.

* * * * *